(12) United States Patent
Lin et al.

(10) Patent No.: US 8,189,260 B2
(45) Date of Patent: May 29, 2012

(54) COLOR DIVIDING OPTICAL DEVICE AND IMAGE APPARATUS WITH THE APPLICATION

(75) Inventors: Hui-Hsiung Lin, Hsinchu County (TW); Chi-Hung Liao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 326 days.

(21) Appl. No.: 12/414,649

(22) Filed: Mar. 30, 2009

(65) Prior Publication Data

US 2010/0165464 A1 Jul. 1, 2010

(30) Foreign Application Priority Data

Dec. 31, 2008 (TW) ................................ 97151901 A

(51) Int. Cl.
*G02B 5/18* (2006.01)
*G02B 27/10* (2006.01)
(52) U.S. Cl. .......... 359/576; 359/621; 359/622; 359/463
(58) Field of Classification Search .................. 359/569, 359/571, 576, 621, 622, 623, 624, 625, 463; 349/95
See application file for complete search history.

(56) References Cited

U.S. PATENT DOCUMENTS

| | | | | |
|---|---|---|---|---|
| 5,566,007 A * | 10/1996 | Ikeda et al. | ....................... | 349/5 |
| 5,682,265 A | 10/1997 | Farn et al. | | |
| 5,764,389 A | 6/1998 | Grinberg et al. | | |
| 6,124,974 A * | 9/2000 | Burger | .......................... | 359/621 |
| 6,278,552 B1 * | 8/2001 | Ishihara et al. | ............... | 359/619 |
| 6,804,045 B2 * | 10/2004 | Barty | ............................. | 359/337 |
| 6,867,828 B2 | 3/2005 | Taira et al. | | |
| 6,992,832 B2 * | 1/2006 | Yamanaka et al. | ............ | 359/619 |
| 7,164,454 B2 | 1/2007 | Numata et al. | | |

FOREIGN PATENT DOCUMENTS

| | | |
|---|---|---|
| JP | 07-072478 | 3/1995 |
| JP | 09-015600 | 1/1997 |
| JP | 10-206792 | 8/1998 |
| JP | 11-023819 | 1/1999 |
| JP | 2002-303713 | 10/2002 |
| KR | 0229515 | 11/1999 |

(Continued)

OTHER PUBLICATIONS

"Office Action of Korea Counterpart Application" with English translation thereof, issued on Nov. 11, 2010, p1-p12, in which the listed references were cited.

(Continued)

*Primary Examiner* — Audrey Y Chang
(74) *Attorney, Agent, or Firm* — Jianq Chyun IP Office

(57) ABSTRACT

A color dividing optical device has an integrated structure of dual surfaces, each has a micro/nano structure. The optical device can perform beam splitting and color dividing on an incident light source, which has a constitution from multiple different wavelengths. In a space, the original incident light source is equally split into multiple light beams in an array, according to light intensity. At the same time, the light beam constituted from different wavelengths is divided into multiple sub-light sources, according to the wavelength, so as to have the function to propagate a color array with color dividing. The optical device with capability of modulating the color wavelengths can transform the wide-band incident light source into sub-light beams in array with color dividing (wavelength dividing) and beam splitting.

22 Claims, 8 Drawing Sheets

FOREIGN PATENT DOCUMENTS

KR 10-2007-0118539 12/2007

OTHER PUBLICATIONS

H. Kanayama et al., "A New LC Rear-Projection Display Based on the 'Color-Grating Method'," Sanyo Electric Co., Ltd., SID 15.1, 1998.

"Office Action of Japan Counterpart Application", issued on Dec. 6, 2011, p1, in which the listed references were cited.

"Office Action of Korea Counterpart Application" with English translation thereof, issued on Feb. 8, 2012, p. 1-10.

"First Office Action of China Counterpart Application", issued on Jun. 16, 2011, p. 1-9, in which the listed reference was cited.

* cited by examiner

COLOR DIVIDING OPTICAL DEVICE AND IMAGE APPARATUS WITH THE APPLICATION

CROSS-REFERENCE TO RELATED APPLICATION

This application claims the priority benefit of Taiwan application serial no. 97151901, filed on Dec. 31, 2008. The entirety of the above-mentioned patent application is hereby incorporated by reference herein and made a part of specification.

BACKGROUND OF THE INVENTION

1. Field of Invention

The present invention relates to color dividing optical device. More particularly, the present invention relates to optical device both of beam splitting and color dividing.

2. Description of Related Art

Digital image is formed from an array of pixels, so as to display an image. Further, for the color image, each pixel is, for example, composed by three sub-pixels of three primary colors in red (R), green (G), and blue (B), so as to express the color shading. Usually, in order to produce the sub-pixels of RGB. Each sub-pixel needs to be implemented with color filter with respect to the desired color. In this manner, the effective portion of the incident light source in white is reduced to ⅓ and the other portion of non-intended colors is absorbed.

For the application in flat displaying apparatus, the back light of the TFT-LCD needs to associate with the gray level modulation of liquid crystal and the color filter, so as to display the color shading of an image. The image sensor in a digital camera, such CCD or CMOS device, also needs the dye-type color filter to display the full-color image of an object. The other applications includes, for example, projector, color video, back-projection TV, . . . , and so on. No matter of single plate, three-plate (TFT-LCD, LCOS) or two-plate prism, all they need to uses the dye-type color filter to express the full color of image. When the system uses the conventional dye-type color filter, each pixel in the color filter can only display single color of the three primary colors R, G, and B. Basically, about ⅔ of the incident white light is absorbed and the light usage rate is reduced. In addition, the battery duration in use for the potable electronic apparatus is also reduced. Further, the fabrication process for the dye-type color filter is rather complicate and the material consumption. The cost for the product and the fabrication factor still remains high.

Some technologies in the art have been proposed for solving the issues, respectively. However, the advantages and disadvantages are both exiting. Therefore, further technologies are still under development.

SUMMARY OF THE INVENTION

The invention provides a color dividing optical device, which can replace the convention dye-type color type. Under the situation with high usage rate of the light, the color sub-light beam in an array can be produced in corresponding to the array pixel of the image apparatus. In addition, the sub-light beams can be incident onto the panel by small incident angle or in perpendicular.

The invention provides a color dividing optical device, having a transparent substrate with a first surface and a second surface, the first surface receiving an incident light beam. The color dividing optical device includes a plurality of first micro-structural regions, on the first surface to form an array, and a surface of each of the first micro-structural regions has a first grating micro-structure. A plurality of second micro-structural regions, on the second surface, disposed in corresponding to the first micro-structural regions, and a surface of each of the second micro-structural regions has a second grating micro-structure.

The invention also provides a color dividing optical device, including a transparent substrate, having a plurality of micro-lens structure regions forming an array. Each micro-lens structure region has two surfaces of a first surface grating micro-structure and a second surface grating micro-structure. The micro-lens structure regions divide an incident light into multiple light beams. The first surface grating micro-structure splits the light beams into multiple color lights, the second surface grating micro-structure guides the color lights to a predetermined direction.

The invention also provides an apparatus of image panel. The apparatus includes an image panel, having a plurality of pixels formed as a pixel array, wherein each of the pixels comprises multiple sub-pixels, respectively corresponding to multiple primary color lights (such as RGB or more). A color dividing optical device panel (or plate) receives an incident light to produce the primary color lights (such as RGB or more). The color dividing optical device panel (or plate) includes a transparent substrate, having a plurality of micro-lens structure regions forming an array corresponding to the pixel array. Each micro-lens structure region has two surfaces of a first surface grating micro-structure and a second surface grating micro-structure. The micro-lens structure regions divide an incident light into multiple light beams, the first surface grating micro-structure splits the light beams into multiple color lights, the second surface grating micro-structure guides the color lights to a predetermined direction.

The invention also provides a color dividing optical device, having a transparent substrate with a first surface and a second surface, the first surface receiving an incident light beam. The color dividing optical device includes a plurality of first micro-structural regions, on the first surface to form an array. A planar structure is implemented on the second surface, and a second grating micro-structure region is implemented thereon in corresponding to the first grating micro-structure region.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

For the optical phenomenon of an optical device, the invention considers the periodic optical micro/nano structure. By adjusting the relative angle between the incident light and the periodic micro/nano slant surface, when the direction of the diffracting light is the same as a refraction direction taking the groove facet as the refraction plane, the diffraction performance on the diffraction direction (or the refraction direction of the facet) can be maximum. The invention can integrate the refraction and diffraction in optimized function, and design an integrated-form apparatus for simultaneously diving beams and splitting colors for the incident light source with several wavelength bands, that is, dividing wavelength function. The dividing wavelength function, as an example, is that the original incident light source in a space is divided into sub-light beams with equal light intensity. Simultaneously, the light beam is split according to the different wavelength bands. As a result, the sub-light beams are split in accordance with the wavelength, so as to form the color array in propagation. This is color splitting function. The apparatus with controllable on the color with respect to wavelengths can convert the wideband incident light source into array of sub-light beams with color splitting (wavelength dividing) and beam dividing. It can replace the conventional dye-type color filter. The apparatus can also be formed on a polarization material, such as PEN, PDLC, or cholesterol liquid crystal or various reflection-type polarization plate. As a result, the polarized color array in propagation can be developed. When it is applied in image sensing device, image displaying panel or image projector, the light usage rate can be greatly improved with respect to the conventional dye-type color filter.

Several embodiments are provided for descriptions. However, the present invention is not limited to the provided embodiments. In addition, the embodiments can be properly combined to each other.

Figure 1:
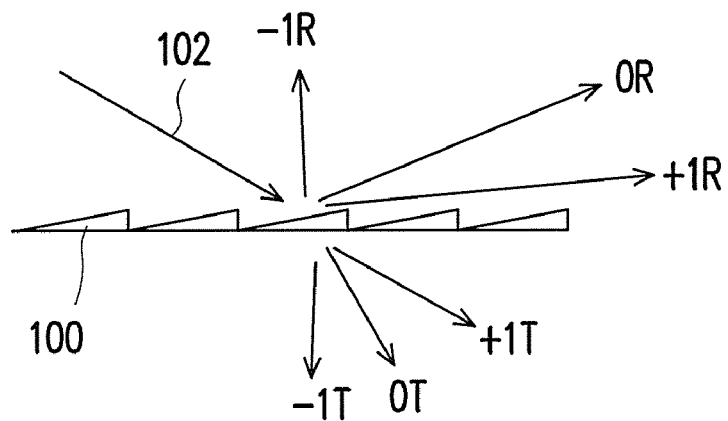
FIG. 1 is a cross-sectional view, schematically illustrating one of motivations in the invention about the planar grating structure.

First, the invention considers the planar-type grating. FIG. 1 is a cross-sectional view, schematically illustrating one of motivations in the invention about the planar grating structure. In FIG. 1, for a planar-type grating 100, it has periodic triangular grating structure, for example. After an incident light 102 with a wavelength enter the planar-type grating 100, in accordance with the period and shape of grating, the transmit light includes, for example, the diffraction lights of 0 T, +1T and −1T at the diffraction order of 0, +1, and −1. For the reflection light, it includes, for example, the diffraction lights of 0R, +1R and −1R at the diffraction order of 0, +1, and −1. Since the wavelengths of the three primary lights of RGB are different, the color can be split.

Figure 2:
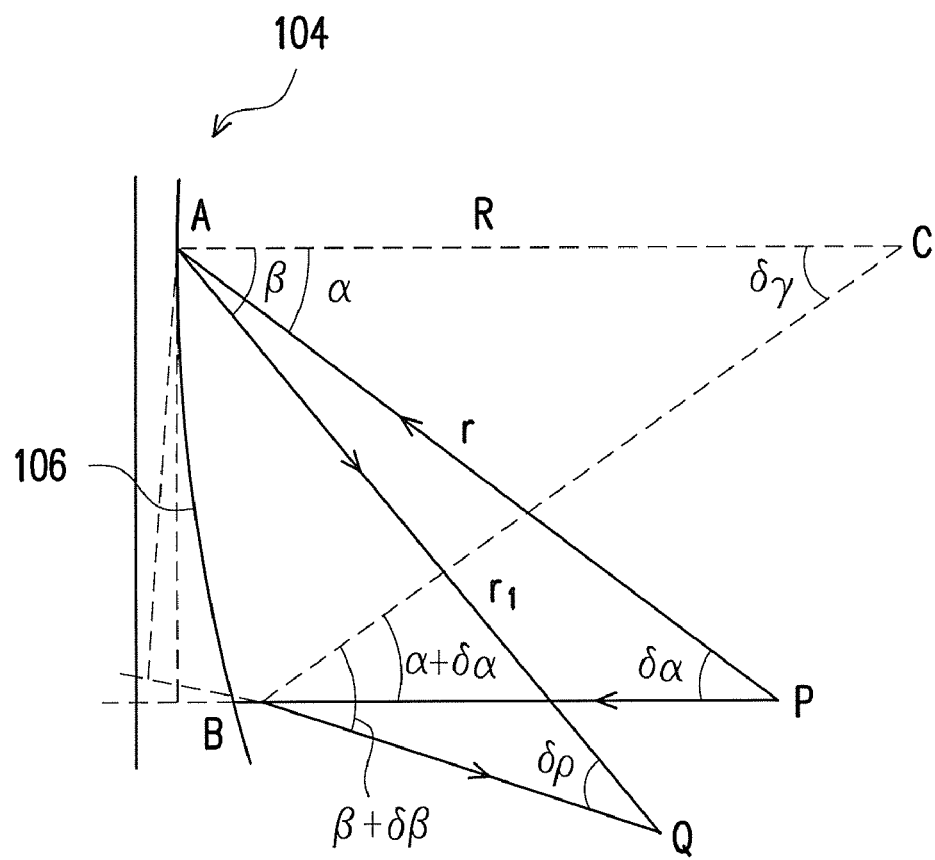
FIG. 2 is a cross-sectional view, schematically illustrating a curving grating structure.

In continuation, the invention considers the optical phenomenon of the curving-type grating. FIG. 2 is a cross-sectional view, schematically illustrating a curving-surface grating structure. In FIG. 2, the curving surface 106 of a curving-surface grating structure 104 has fine grating structure (not specifically drawn) distributed thereon. According to the phenomenon of Rowland's circle, when the incident light in wideband enters from the point P to the incident point A of polygon grating micro-structure in period or non-period at the integrated curving-surface, a split optical spots with multiple wavelengths (or color) is output at the Q point. The radius R of the curving-surface structure is a distance from the point C to the point A. If the period of the grating on the curving-surface 106 is p for the incident lights of RGB, the incident lights have wavelengths of λr, λg, and λb. The grating around the point A is considered to be planar grating. CA is the normal line of the plane grating. The incident angles and the diffraction angles are respectively α and β. According to the grating formula, the primary color lights taking the m$^{th}$ elder for the diffraction light, the diffraction angles are as follows:

$$\beta_r = \sin^{-1} \frac{m\lambda_r}{p}, \tag{1}$$

$$\beta_g = \sin^{-1} \frac{m\lambda_g}{p},$$

$$\beta_b = \sin^{-1} \frac{m\lambda_b}{p}.$$

Further, according to the curving-surface grating:

$$\frac{\cos\alpha}{R} - \frac{\cos^2\alpha}{r} + \frac{\cos\beta}{R} - \frac{\cos^2\beta}{r_1} = 0. \tag{2}$$

It is so-called the Rowland's circle, in which the incident point P and diffraction point Q are on the Rowland's circle.

After numeric analysis, a first set of periodic or non periodic polygon structures for the integrated curving-surface micro-structure can be obtained and then enter the panel by a deflecting angle or by perpendicular. The light is converged, parallel or divergent to enter the panel as the target. Calculation in numeric analysis is continuous, and a second set of periodic or non periodic polygon structures for the integrated curving-surface micro-structure can be obtained.

The invention proposes the color dividing optical device to perform diving beam and splitting color (wavelength) for the incident light with different wavelength bands. For example, the original incident light in space is divided into multiple sub-light beams with equal light intensity, and then the light beam in different wavelength compositions is split into color array in propagation. For the preferred embodiment, the incident light is divided into sub-light beams for the three primary colors. The sub-light beams of each color in the color array can emit on a direction substantially parallel to the incident light. The output light beams can be parallel, and convergent/divergent, propagating by the optical behavior. In addition, according to the system and the light source, the incident light can use multiple primary color light sources. The apparatus with control on the wavelength of color can take pale of the conventional dye-type color filter. Under the condition remaining high usage rate of incident light, the color sub-light beams corresponding to pixel array for the image apparatus, such as TFT-LCD, LCOS, CCD, CIS, . . . , and so on, can be produced. The color sub-light beams enter the panel by small incident angle or perpendicular.

The invention also provides an integrated micro-structure with a pair of surfaces in combination from curving surface and/or planar surface to have refraction/diffraction, respectively on top and bottom surfaces of a planar substrate. Taking the application in flat displaying apparatus as an example, the apparatus can take a pair of micro-structures in micro-curving surfaces as an array as base, capable of converging the diameter of the light beams. Additionally, periodic or non-periodic structures can be further formed on the curving surface for forming refraction/diffraction surface to simultaneously achieve function of dividing light and splitting color, as a controllable wavelength color apparatus.

Figure 3:
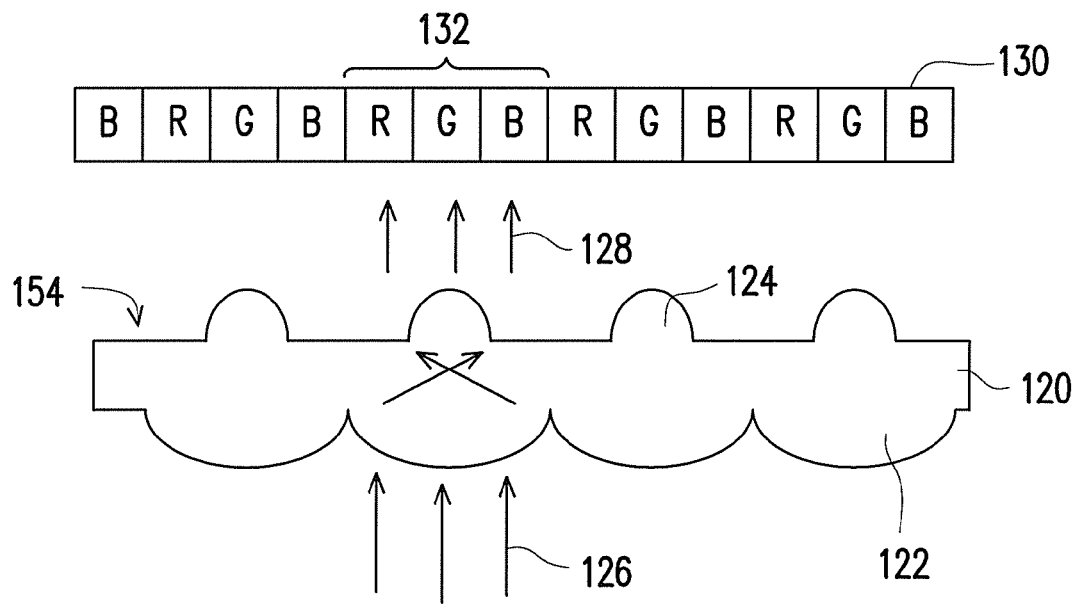
FIG. 3 is a cross-sectional view, schematically illustrating an optical device used to produce the divided and converged light beams.

FIG. 3 is a cross-sectional view, schematically illustrating an optical device used to produce the divided and converged light beams. In FIG. 3, the optical device 154 has a transparent substrate 120. Lens micro-structure 122 with converging light is formed on surface of the transparent substrate 120 to receive incident light. As a result, the incident light 126 respectively passing each lens micro-structure 122 forms a converged sub-light beam. On the other surface of the transparent substrate 120 further has lens micro-structure 124, correspondingly, so as to transform the converged light beam into condensed light 128, which propagates about the same as the direction of the incident light 126. The condensed light 128 can be, for example, associating with the pixel 132 of the image panel 130 to provide the light source. Foe the integrated structure, the transparent substrate 120 and the lens micro-structures 122 and 124 can be integrated as an optical device by a single body. The curving surfaces of the lens micro-structures 122 and 124 can be designed according to the actual need.

Figure 4:
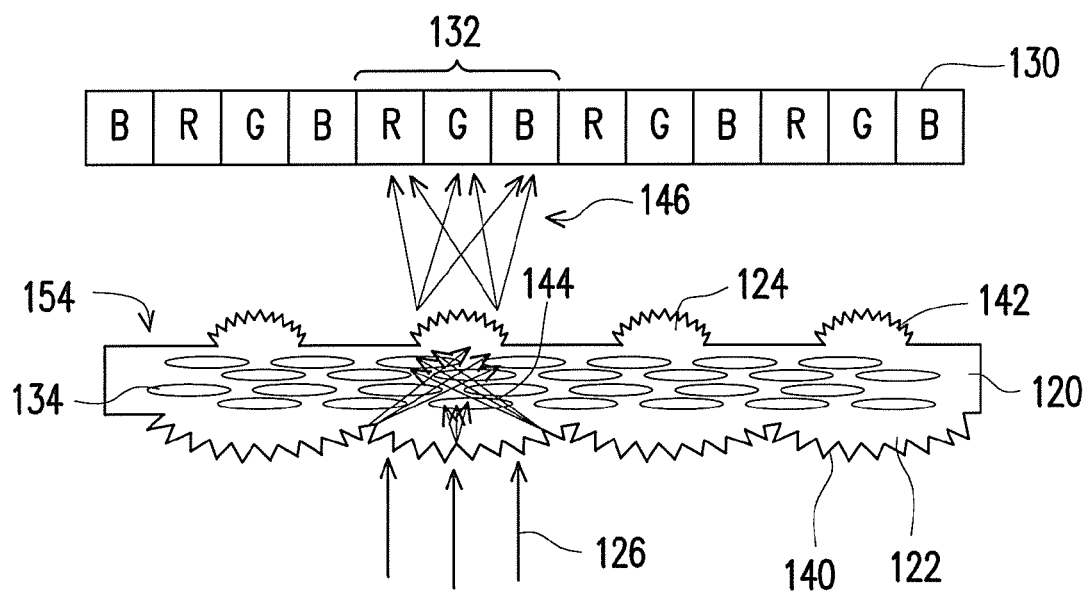
FIG. 4 is a cross-sectional view, schematically illustrating a color dividing optical device, according to an embodiment of the invention.

For the pixel 132 of the image panel 130, if the color effect is to be displayed, the pixel 132 is formed by the sub-pixels of RGB. In this consideration, the optical device 154 further needs the capability of color splitting. FIG. 4 is a cross-sectional view, schematically illustrating a color dividing optical device, according to an embodiment of the invention. In FIG. 4, it is based on the structure in FIG. 3 to provide the multiple sub-light beams from the incident light, in accordance with the positions of pixels on the displaying panel. Then, for the mechanism of color splitting in detail, the invention uses diffraction phenomenon of grating to split colors. The grating structure 140 is further formed on the surface of the lens micro-structure 122. In other words, the incident light 126 includes several wavebands for the primary colors, such as three primary color of R, G, B in different wavelengths, which are caused by the grating structure 140 to splitting color as the diffraction light 144. lens micro-structure 122 is, for example, a columnar curving surface. The cutting grooves of the grating structure 140 are along the longitudinal direction of the column, that is, perpendicular to the drawing sheet in parallel extension. FIG. 4 is the schematic drawing of the grating structure. The effect of splitting color for the wavelength and the deflection direction of the light are depending on the design condition of the grating structure and can be adjusted in accordance with the actual need.

After each of the divided light beams passes the space in the transparent substrate 120 for propagation, it achieves the sufficient level to split the primary color lights, and enters the lens micro-structure 124. Another set of grating structure 124 is also formed on the lens micro-structure 124 with the effect to deflect the split primary color lights into a direction as the primary color lights 146, which are corresponding to the sub-pixels of the image panel 130. Preferred design is causing the primary color lights 146 emit on a direction to enter the image panel 130 by a small incident angle or substantially at perpendicular, so that it is at least helpful for the alignment and pure color in the whole system. The range of the small incident angle is, for example, within 5 degrees, deviated from the normal direction, or even within 2 degrees. However, it is not the absolutely needed condition.

In addition, if it needs the polarization effect, the transparent substrate 120 can include the polarization material 134 for producing polarized light, so that the color light beam with polarization can be simultaneously produced.

Figure 5:
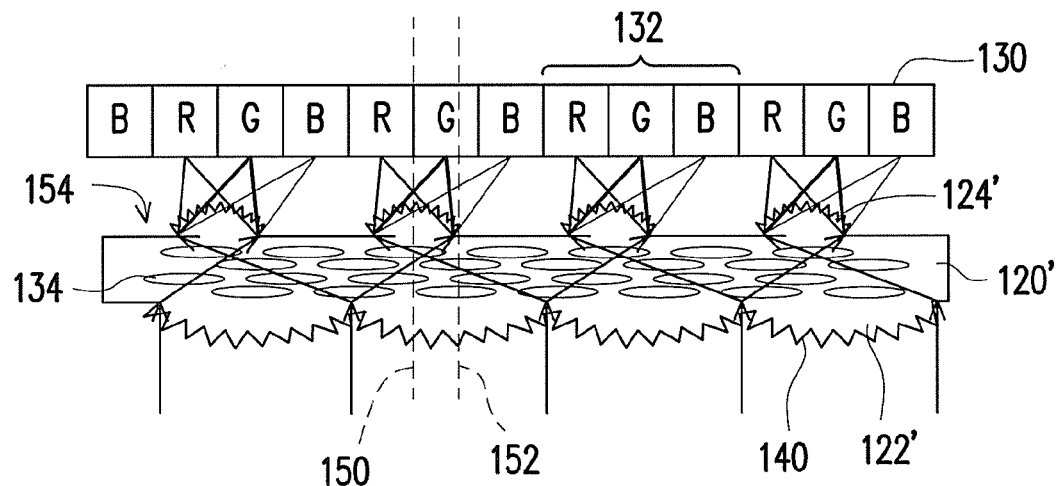
FIG. 5 is a cross-sectional view, schematically illustrating a color dividing optical device, according to an embodiment of the invention.

FIG. 4 has described the mechanism of the color dividing optical device of the invention. With the same mechanism, the invention can have various design modifications. FIG. 5 is a cross-sectional view, schematically illustrating a color dividing optical device, according to an embodiment of the invention. In FIG. 5, it is like FIG. 4 but has difference for the transparent substrate 120'. The difference of the transparent substrate 120' from that in FIG. 4 is that a center position 150 of the lens micro-structure 124' is dislocated from the center position 152 of the lens micro-structure 122'. The primary color lights divided by the lens micro-structure 122' is deflected by a certain angles. The location of the image panel 130 is in association the location due to the deflection angle. In addition, the transparent substrate 120' can also include polarization material 134, to simultaneously polarize the light to the intended polarization state.

Figure 6:
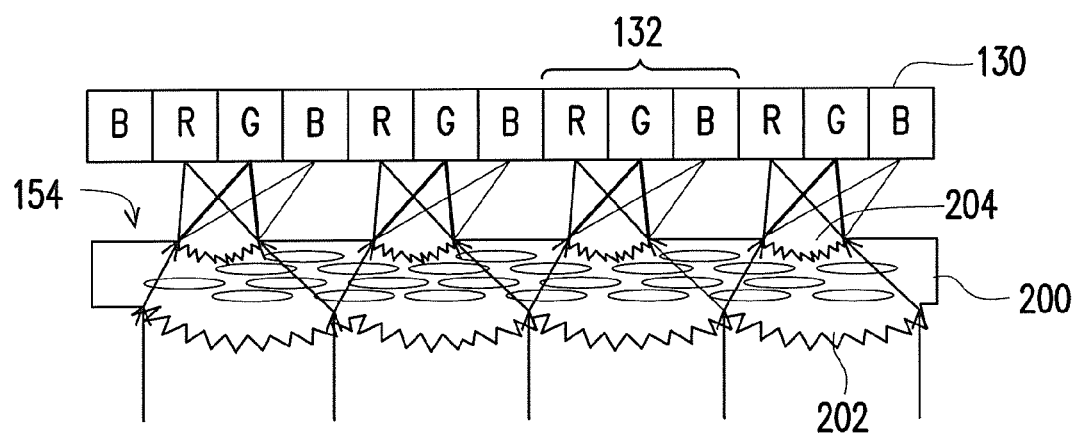
FIG. 6 is a cross-sectional view, schematically illustrating a color dividing optical device, according to an embodiment of the invention.

FIG. 6 is a cross-sectional view, schematically illustrating a color dividing optical device, according to an embodiment of the invention. In FIG. 6, the lens micro-structures 202, 204 on the transparent substrate 200 in this embodiment can be the convex-concave structure, which depends on the optical phenomenon and is in accordance with the distance of the image panel 130 and the locations of the pixels thereon without specific limitation on structure.

According to embodiments in FIG. 5 and FIG. 6, the split color lights are, for example, converged on the surface of the image panel 130. However, for the performance of the image panel 130, the primary color light is not necessary to converge on the surface of the image panel 130. In accordance with the requirement of viewing angle for the image panel, the sub color light beams can enter the image panel at the top or bottom surfaces or inside the panel.

Figure 7:
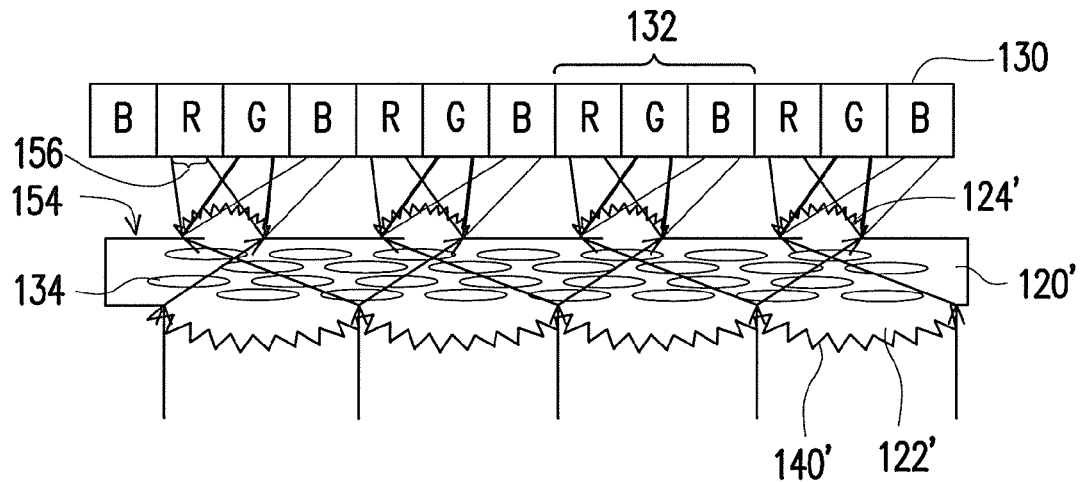
FIG. 7 is a cross-sectional view, schematically illustrating a color dividing optical device, according to an embodiment of the invention.

FIG. 7 is a cross-sectional view, schematically illustrating a color dividing optical device, according to an embodiment of the invention. In FIG. 7, it is like the design in FIG. 5 but the distance between the optical device 154 and the image panel 130 can be reduced, so that the primary color light enters the sub pixel is a incident region 156. However, the curvatures of the grating structure 140', 142' of the lens micro-structure 122' and 124' can be changed.

Figure 8:
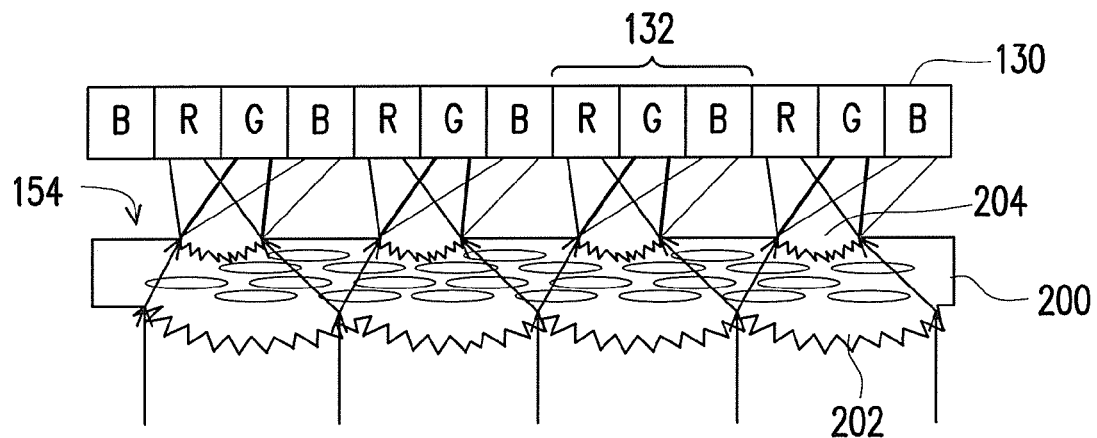
FIG. 8 is a cross-sectional view, schematically illustrating a color dividing optical device, according to an embodiment of the invention.

FIG. 8 is a cross-sectional view, schematically illustrating a color dividing optical device, according to an embodiment of the invention. In FIG. 8, it is like FIG. 6 but the lens micro-structures 202 and 204 on the transparent substrate 200 of the optical device 154 produce effects of dividing light beam and converging the light. The grating structure on the surface can produce the effect to guide the light to the right direction.

Remarkably, the curving surface of the foregoing lens micro-structure is taking the columnar curving surface with symmetry to the center line as an example. However, based on the optical deflection phenomenon and grating color splitting phenomenon, the curving surface of the lens micro-structure can also be non-symmetric curving surface without limiting to the columnar structure. However, the columnar structure is helpful for arranging the pixel positions at behind.

Figure 9:
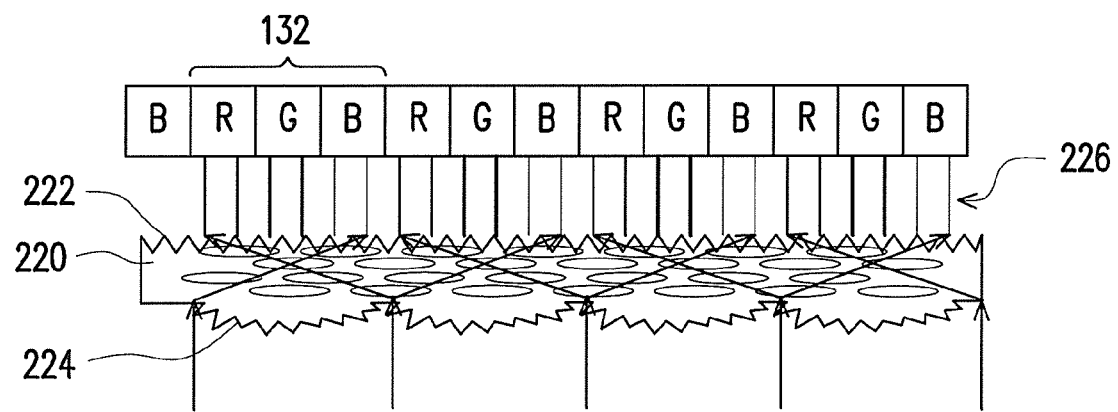
FIG. 9 is a cross-sectional view, schematically illustrating a color dividing optical device, according to an embodiment of the invention.

In continuation, when considering the effect of dividing light beam, the lens micro-structure can be structures of flat-convex or flat-concave. FIG. 9 is a cross-sectional view, schematically illustrating a color dividing optical device, according to an embodiment of the invention. In FIG. 9, the structure on the substrate 220 of the optical device as the incident surface, for example, it can be design according to convex-flat. However, the flat-convex can also be taken. Taking the convex-flat design as an example, the light incident surface of the substrate 220 has convex lens micro-structure. The surface of the lens micro-structure can also have grating structure 224. The incident light has the effect of the lens micro-structure and the grating structure 224 on its surface, it produces the dividing light beam and the converging effect in need. Then, the light beam further passes the space of the transparent 220 to reach another surface. This surface is flat and the grating structure 222 is the surface for guiding the deflected primary color light back to emit parallel, so as to obtain the parallel primary color light 226, which corresponds to the multiple sub-pixels of the pixel 132. The parallel primary color light 226 can be convergent or divergent, depending on the requirement of the image panel.

FIG. 9 is the design by convex-flat. However, if it is the design of flat-convex, then the lens micro-structure in convex type can be implemented on the light outputting surface. The other designs by flat-concave and concave-flat can also achieve the effects of dividing light and splitting color.

Figure 10:
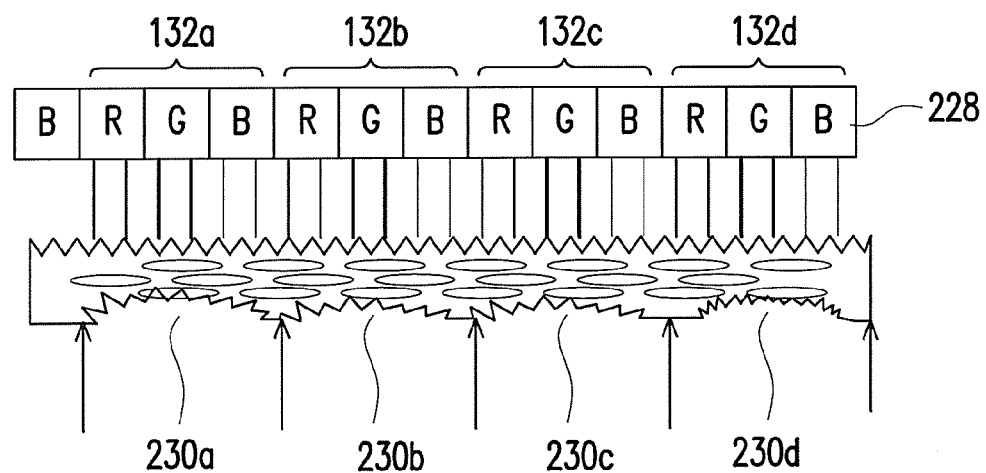
FIG. 10 is a cross-sectional view, schematically illustrating a color dividing optical device, according to an embodiment of the invention.

FIG. 10 is a cross-sectional view, schematically illustrating a color dividing optical device, according to an embodiment of the invention. In FIG. 10, the optical device is designed based on the concave-flat structure. However, the curving surfaces of the lens micro-structures, which correspond to the pixels 132a, 132b, 132c, 132d in the image panel 228, are not necessary to be all the same. For example, the concave lens micro-structures 230a-230d are shown in this embodiment. In addition, the curving surface can be non-spherical surface or even a general curving surface being more free in design, so called "free curving surface" in the invention. In other words, the structure in the embodiment can be a combination from a flat surface with a free curving surface or a combination from a free curving surface with a flat surface.

It can further be, for example, the convex-flat structure. However, the grating is just implemented on the flat surface to split the light beams and the convex curving surface is to converge and deflect the light beams. In other words, the invention is not limited to the embodiments.

Figure 11:
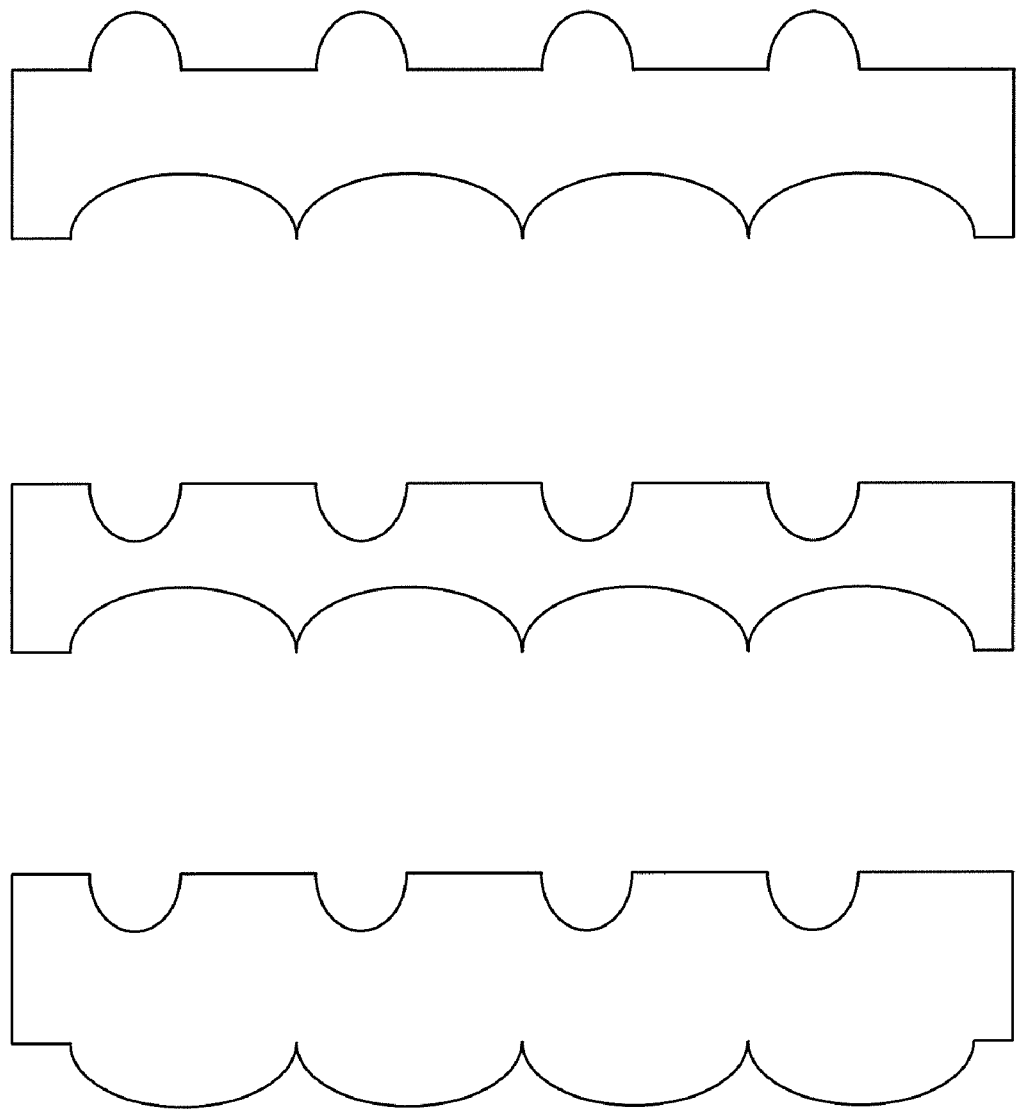
FIG. 11 is a cross-sectional view, schematically illustrating a color dividing optical device, according to an embodiment of the invention.

FIG. 11 is a cross-sectional view, schematically illustrating a color dividing optical device, according to an embodiment of the invention. In FIG. 11, the lens micro-structure is not limited to the provided embodiments. The lens micro-structure can further be, for example, concave-convex, concave-concave, convex-concave. For example, the center positions of the two lens micro-structures on the two surfaces can have dislocation, in accordance with the grating effect on the surface.

Figure 12:
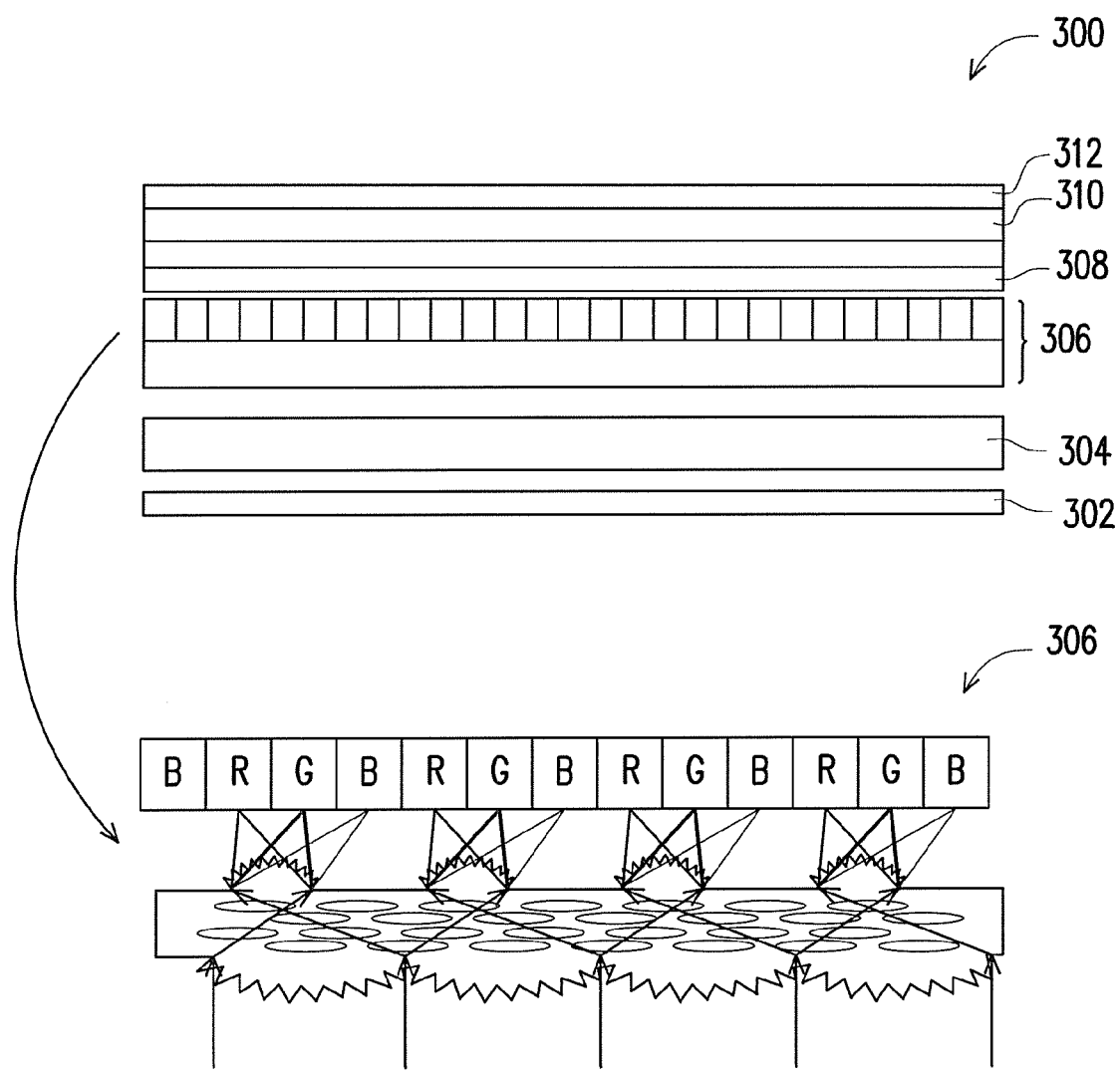
FIG. 12 is a cross-sectional view, schematically illustrating a color dividing optical device, according to an embodiment of the invention.

FIG. 12 is a cross-sectional view, schematically illustrating a color dividing optical device, according to an embodiment of the invention. In FIG. 12, the color dividing optical device of the invention can be applied in the image panel. The image panel can be, for example, the image displaying panel or sensing panel for feting image. In the embodiment, the LCD apparatus 300 for displaying image, taken as an example, includes a light source 304 for producing white light. The reflection plate 302 can reflect the incident light from the light source back for re-use. The light source 304 produces white light, which enters a color dividing optical device 306 of the invention to produce the primary color lights, corresponding to the sub-pixels. The optical elements implemented behind the color dividing optical device 306 includes, for example, the polarizer 308, the liquid crystal cell layer 310 and analyzer 312.

Figure 13:
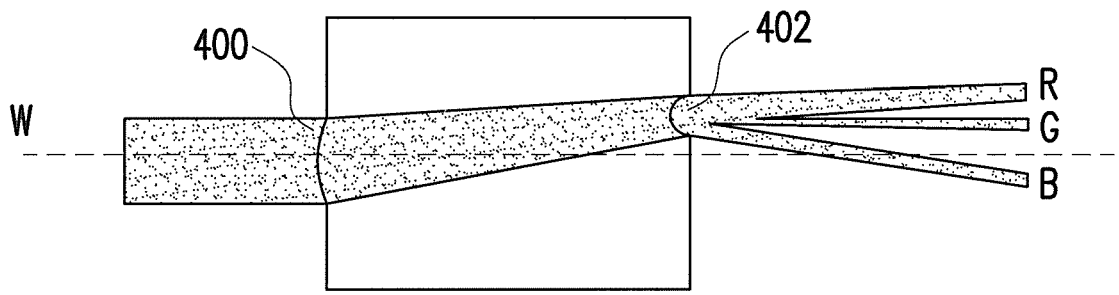
FIGS. 13-14 are drawings, schematically illustrating the mechanism of color dividing by a simulation, according to an embodiment of the invention.
Figure 14:
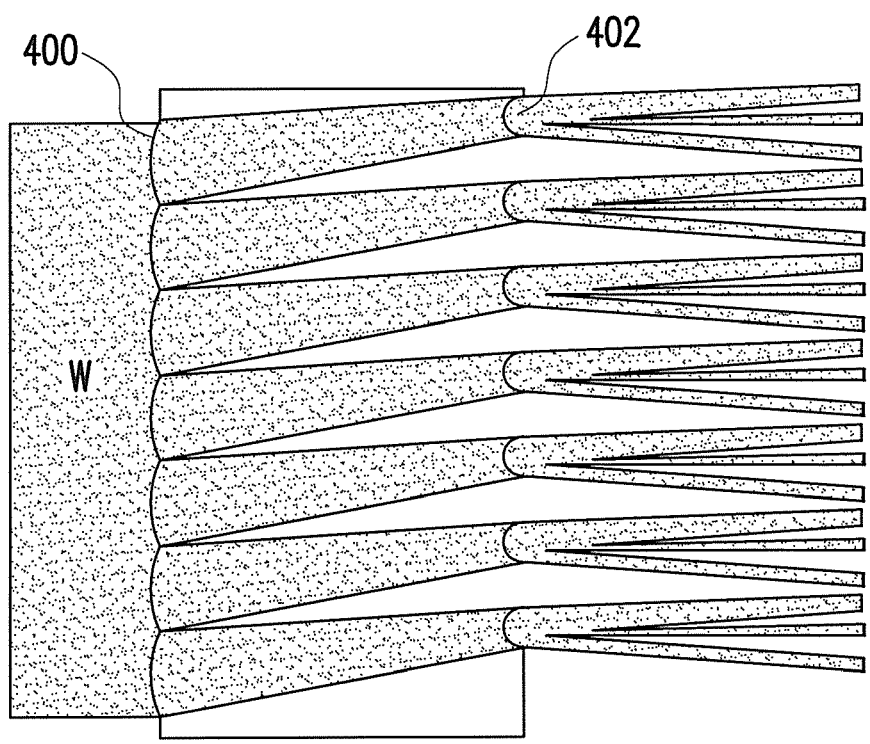

The color dividing optical device 306 is shown in a magnified structure, such as the foregoing described color dividing optical device 306, is to divide the light source into beams with respect to the pixel and split the beam into primary color lights with respect to the sub-pixels, such as three primary color of RGB. As a result, the opening rate, polarization efficiency and usage rate of light, for example, can be improved. FIGS. 13-14 are drawings, schematically illustrating the mechanism of color dividing by a simulation, according to an embodiment of the invention. In FIGS. 13-14, the size ratio is just schematically shown. The invention has verified the performance of color dividing optical device with a single unit, as shown in FIG. 13, having two micro-lenses curving surfaces 400 and 402. The periodic grating is formed on the curving surfaces with period of 4000 nm, for example. The curvature radii of the two curving surfaces are R1=1 mm and R2=0.1667 mm. The two rod surfaces have a pitch by 2.504 mm. The length of rod surface is 10 mm. The distance between the receiving point and the tip of the second rod surface is 0.5 mm. Further, a center position of the second rod surface for each set is dislocated by 0.2286 mm from a center position of the first rod surface. The white light (W) can be split into primary color lights of RGB, and the primary color lights of RGB forms as a light beam unit, corresponding to the pixel. The light beam unit has converging effect. Wavelength of green light (G) is 544 nm, wavelength of red light (R) is 611 nm, and wavelength of blue (B) is 436 nm.

Since the second rod surface has the dislocation by 0.2286 mm, which is based on the reference wavelength of 544 nm, the light tracking in FIG. 13 can show that the diffraction behavior has the center at wavelength 544 nm for green light. The other red light with 611 mm and blue light with 435 nm are split at left and right to form a pixel.

In FIG. 14, taking seven foregoing pixel units as an array in an example, the design parameters is set, so that the pixels do not interfere to each other and the displaying effect can be achieved.

In other words, the invention can control the color dividing optical device. For example, a pair of curving surfaces or flat surfaces, or the combination is formed on top and bottom surfaces of a planar substrate to form an integrated micro-structure for diffraction and refraction.

For example, a micro-structure with a pair of micro-curving surface in an array, for reduce the diameter of light beam, can include a substrate. The top and bottom surfaces of the substrate respectively include multiple micro-structures in the same shape. The micro-structures on the top and bottom surfaces have individual curvature, so as to divide and condense the light source into beams with reduced beam size for entering the pixel. Each light beams is split in wavelength to perpendicularly enter the pixel. The optical behaviors of the condensed light beam can be parallel, convergent, or divergent for achieving the function of dividing beam.

For example, a pair of periodic micro-structures is formed on the surface of micro-structure with micro-curving surface in an array. Wherein, the substrate further includes the smaller periodic micro-structures on the top and bottom micro-curving surfaces in an array, so that the surface has curving surface in an array for diffraction and refraction. The periodic micro-structure at the first surface divides the incident light source in wavelength, that is, splits color with deflecting and converging effect in the substrate. This is splitting colors. After the split light beams continuously propagate and pass the periodic micro-structures at the second surface, the light beams in split wavelength (or split color) are refracted to a direction, substantially perpendicular to the image displaying panel and condensed. It is, for example, reaching to the panel in parallel or divergent. At this moment, the light source has been divided into beams and split into colors of RGB for the sub-pixel, and then enters the panel. The beam in different wavelength respectively emits to a different location. However, the emitting direction is still parallel to the direction of the incident light.

For example, the micro-curving surface of the two top/bottom surfaces in the diffraction/refraction integrated micro-structure can be the same or different curving structure. The curvature can be positive, zero, or negative.

Further for example, the micro-curving surface of the two top/bottom surfaces in the diffraction/refraction integrated micro-structure can include periodic or non-periodic polygon structure. The polygon structure can be blazed grating, multiple-stage grating, or sub-wavelength grating. The grating period cab be between $0.2\lambda$ and $30\lambda$.

Further for example, the micro-curving surface of the two top/bottom surfaces in the diffraction/refraction integrated micro-structure can include periodic or non-periodic polygon structure. The center positions of the curving micro-structure is aligned or dislocated, so as to have the effect of splitting color.

Further for example, after entering the top/bottom surfaces of the diffraction/refraction integrated micro-structure with periodic/non-periodic polygon structure, the incident light can be non-polarized light or polarized light.

Further for example, the substrate material of the optical plate of the diffraction/refraction integrated micro-structure with periodic/non-periodic polygon structure can be different from the material for the polygon structure.

Further for example, the substrate material of the optical plate of the diffraction/refraction integrated micro-structure with periodic/non-periodic polygon structure and the material for the polygon structure can be both in polarization material.

Further for example, the substrate material of the optical plate of the diffraction/refraction integrated micro-structure with periodic/non-periodic polygon structure can be inserted with a polarizing material layer.

Further for example, the invention can have applications in image displaying panel of TFT-LCD, OLED and LCOS, or image projector, or image sensing apparatus of CCD, CIS and CMOS, or LED illumination, or interior light guiding apparatus, or bio detection apparatus, or sunlight collection apparatus.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A color dividing optical device, having a transparent substrate with a first surface and a second surface, the first surface receiving an incident light beam, comprising:
a plurality of first micro-structural regions, on the first surface to form an array, and each of the first micro-structural regions has a first columnar curving surface and a first grating micro-structure formed on the first columnar curving surface; and
a plurality of second micro-structural regions, disposed on the second surface of the transparent substrate, respectively corresponding to the first micro-structural regions and each of the second micro-structural regions has a second columnar curving surface and a second grating micro-structure formed on the second columnar curving surface,
wherein the first micro-structural regions and the second micro-structural regions are one-to-one respectively matched.

2. The color dividing optical device of claim 1, wherein the first micro-structural regions are to divide the incident light beam into a plurality of converged light beams in an array, the first grating micro-structure on the first columnar curving surface splits each converged light beam into multiple color sub-light beams.

3. The color dividing optical device of claim 2, wherein the second micro-structure regions are to guide the converged light beams to a predetermined direction as multiple condensed light beams, the second grating micro-structure on the second columnar curving surface guides each color sub-light beam of each condensed light beam to a predetermined sub-direction.

4. The color dividing optical device of claim 3, wherein the predetermined sub-direction is incident onto a display panel substantially in a small angle or in perpendicular.

5. The color dividing optical device of claim 3, wherein each of the first columnar curving surface in curvature radius is larger than each of the second columnar curving surface.

6. The color dividing optical device of claim 3, wherein center positions for the first columnar curving surfaces to the second columnar curving surfaces are relatively dislocated.

7. The color dividing optical device of claim 1, wherein center positions for the first columnar curving surfaces to the second columnar curving surfaces are relatively dislocated.

8. The color dividing optical device of claim 1, wherein the first micro-structure regions on the first surface and the second micro-structure regions on the second surface form a concave-concave lens structure, concave-convex lens structure, or convex-concave lens structure, convex-convex lens structure.

9. The color dividing optical device of claim 8, wherein a plurality of output light beams are output from the second surface and each output light beam is split into multiple color beams.

10. The color dividing optical device of claim 9, wherein the output light beams are output being converged and split.

11. The color dividing optical device of claim 1, wherein the transparent substrate also polarizes the incident light beam.

12. The color dividing optical device of claim 1, wherein the first micro-structure regions on the first surface form the array in one-dimension or two-dimension.

13. A color dividing optical device, comprising:
a transparent substrate, having a plurality of micro-lens structure regions forming an array, each of the micro-lens structure regions being a columnar structure and having a first columnar curving surface and a second columnar curving surface, a first surface grating micro-structure formed on the first columnar curving surface and a second surface grating micro-structure formed on the second columnar curving surface, wherein the micro-lens structure regions divide an incident light into multiple light beams, the first surface grating micro-structure splits the light beams into multiple color lights, the second surface grating micro-structure guides the color lights to a predetermined direction.

14. The color dividing optical device of claim 13, wherein each of the micro-lens structure regions is a concave-concave lens structure, or concave-convex lens structure, convex-concave lens structure, convex-convex lens structure.

15. The color dividing optical device of claim 13, wherein the color lights are substantially parallel emitted or converged emitted.

16. The color dividing optical device of claim 13, wherein two center positions of the first columnar curving surface and the second columnar curving surface in each micro-lens structure region are dislocated by a distance.

17. The color dividing optical device of claim 13, wherein the transparent substrate also polarizes the incident light.

18. An apparatus of image panel apparatus, comprising:
an image panel, having a plurality of pixels formed as a pixel array, wherein each of the pixels comprises multiple sub-pixels, respectively corresponding to multiple primary color lights; and
a color dividing optical device panel, receiving an incident light to produce the primary color lights, wherein the color dividing optical device panel comprises:
a transparent substrate, having a plurality of micro-lens structure regions forming an array corresponding to the pixel array, each of the micro-lens structure regions being a columnar structure and having a first columnar curving surface and a second columnar curving surface, and a first surface grating micro-structure formed on the first columnar curving surface and a second surface grating micro-structure formed on the second columnar curving surface,
wherein the micro-lens structure regions divide an incident light into multiple light beams, the first surface grating micro-structure splits the light beams into multiple color lights, the second surface grating micro-structure guides the color lights to a predetermined direction.

19. The apparatus of image panel apparatus of claim 18, wherein each of the micro-lens structure regions is a concave-concave lens structure, or concave-convex lens structure, convex-concave lens structure, convex-convex lens structure.

20. The apparatus of image panel apparatus of claim 18, wherein the color lights are substantially parallel emitted or converged emitted.

21. The apparatus of image panel apparatus of claim 18, wherein two center positions of the first columnar curving surface and the second columnar curving surface in each micro-lens structure region are dislocated by a distance.

22. The apparatus of image panel apparatus of claim 18, wherein the transparent substrate also polarizes the incident light.

* * * * *